United States Patent Office 3,516,578
Patented June 23, 1970

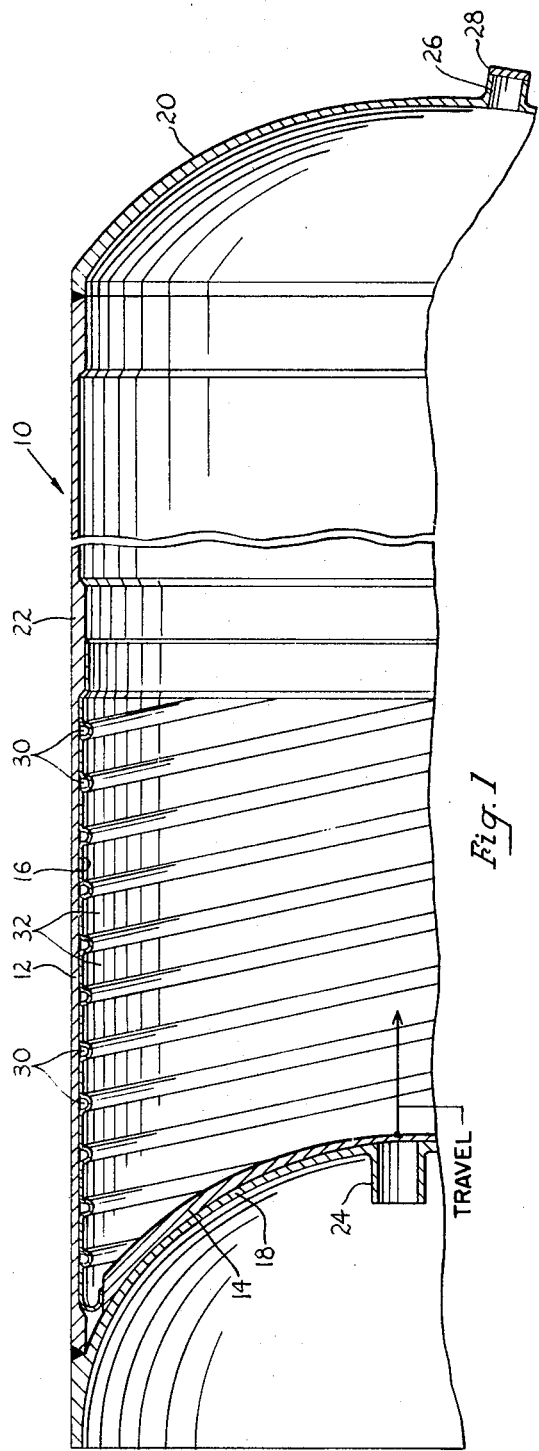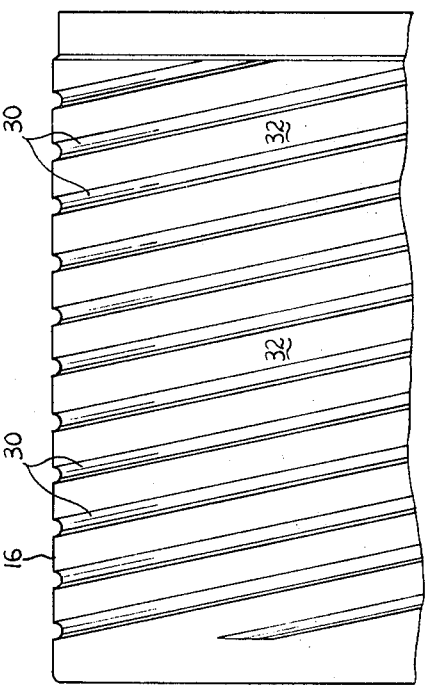

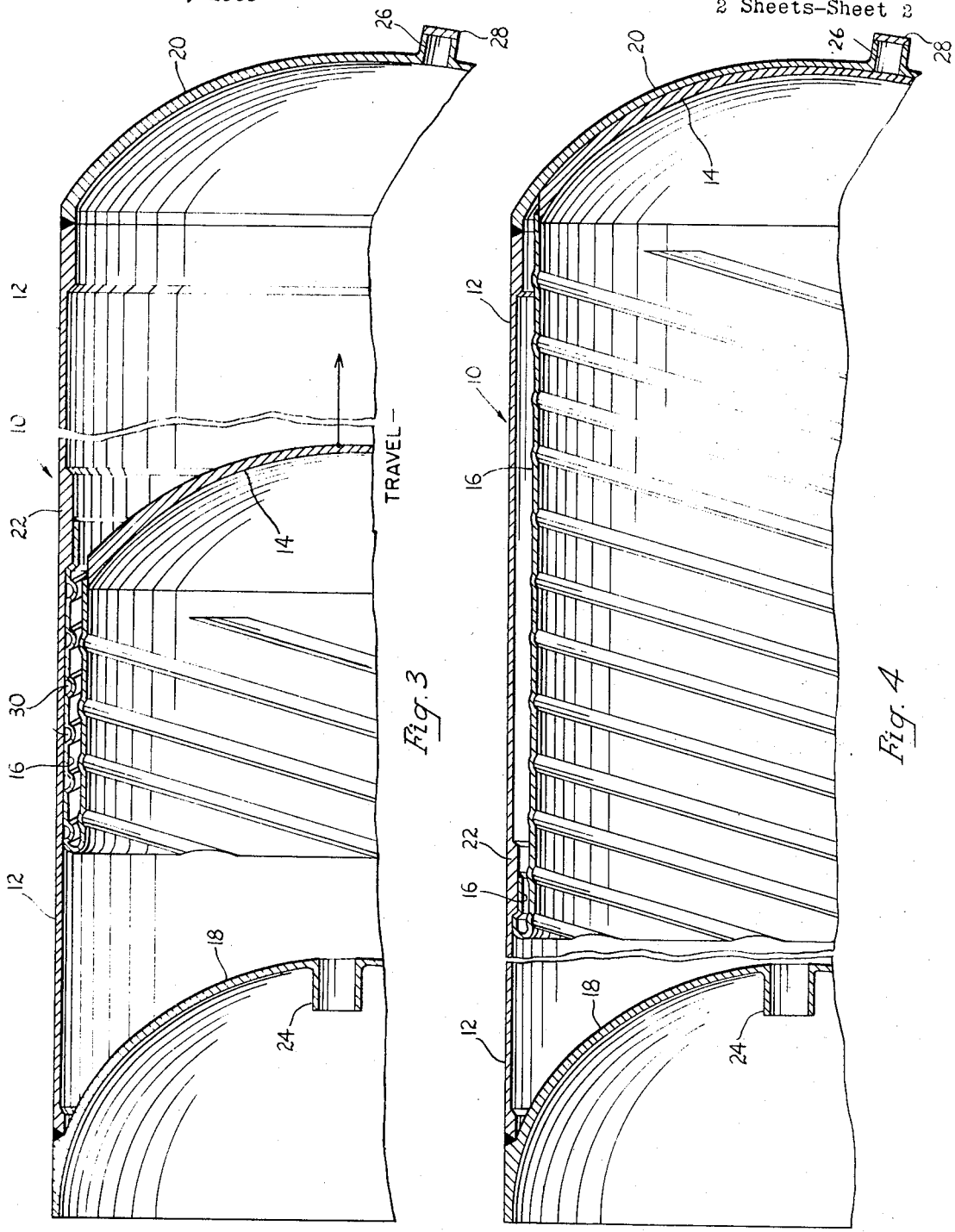

3,516,578
ROLLING METAL DIAPHRAGM
Walter B. Grossman, Fair Lawn, and George B. Rabe, Sparta, N.J., assignors to Thiokol Chemical Corporation, Bristol, Pa., a corporation of Delaware
Filed Oct. 12, 1965, Ser. No. 495,128
Int. Cl. B67d 5/00
U.S. Cl. 222—386.5        4 Claims

ABSTRACT OF THE DISCLOSURE

This invention relates generally to positive displacement, liquid expulsion systems in which a diaphragm is attached to the liquid containing tank and to a piston therein which is propelled by gas pressure through the tank to expel the liquid, and more particularly to an improved diaphragm for such use and other varied applications.

---

Diaphragms of this general type are particularly useful in the liquid propellant expulsion systems of packaged liquid rocket engines but their usefulness has been limited in that their flexibility decreases as their size (and gauge) increases to accommodate greater propellant volumes.

Analytical and experimental work has shown that the cylinder length of the diaphragm is limited by the fact that the same pressure which acts on the piston, also acts laterally on the cylinder. In order to avoid buckling of the diaphragm cylinder, the pressure which produces the piston movement must be less than the critical buckling pressure of the cylinder.

Accordingly, the main object of the present invention is to provide an improved diaphragm construction which permits the use of a diaphragm cylinder of increased length in an expulsion system and hence enables an increased propellant or liquid volume which may be stored and expelled.

An important object of the present invention is to provide a hermetically sealed, rolling metal diaphragm for attachment to the expulsion tank at one of its ends and to the expulsion piston at its other end so that upon liquid expulsion movement of the piston, the diaphragm is rolled back with respect to itself to act as a seal for the piston during fluid expulsion from the tank.

Another important object of the present invention is to provide a novel diaphragm of the type described which is of improved and thinner construction which ensures its unrolling at lower pressures, consuming less volume, and being of reduced weight.

Another important object of the present invention is to provide a hermetically sealed, rolling metal diaphragm for piston propellant expulsion in packaged liquid rocket engines in which resistance to diaphragm cylinder buckling is provided by multiple-lead, helically disposed indentations which are formed in the walls of the cylinder.

Other objects and advantages of the invention will become apparent during the course of the following description.

In the drawings we have shown one embodiment of the invention. In this showing:

FIG. 1 is a fragmentary, central, longitudinal sectional view of a liquid expulsion apparatus in the storage position showing the tank for the liquid to be expelled, the expelling piston, and the diaphragm hermetically sealed to both the piston and the tank;

FIG. 2 is a fragmentary elevational view showing the diaphragm and its helical indentations which increase its resistance to buckling;

FIG. 3 is a view similar to that of FIG. 1 but showing the diaphragm partially rolled back during movement of the piston to eject the liquid from the tank; and FIG. 4 is a view similar to that of FIG. 3 but showing the diaphragm completely rolled back with the expelling piston at the end of its expelling stroke.

Referring to the drawings, numeral 10 designates a liquid expulsion apparatus as a whole which comprises a cylindrical tank 12, a piston 14, and a diaphragm 16.

The tank 12 is provided with hemispherically-shaped ends 18 and 20 and intermediate its length with an inner peripheral trapezoidal shoulder 22 to which one end of the diaphragm 16 is hermetically sealed. The tank end 18 is provided with an inlet 24 for the admission of a gas or other pressurizing medium into the tank to act on the piston 14 and force it through the tank to abut the other end wall 20. The liquid filling the tank to the right of the piston is expelled through a discharge port 26 which may be provided with a burst disc, etc. 28.

The piston 14 may be formed of aluminum or other light-weight metal and is hemispherical to conform with the tank ends 18 and 20 to afford a maximum of volumetric and expulsion efficiency.

The diaphragm 16 comprises a cylindrical shell in which sufficient resistance to buckling by the lateral pressures of the pressurizing medium, is provided by multiple lead, helically disposed indentations 30 formed in the walls of the diaphragm shell. These indentations are formed in the outer surface of the diaphragm and it also will be appreciated that these indentations, from the inner surface, comprise helically disposed ribs.

These helically disposed indentations, or ribs when viewed from the inside, subdivide the cylindrical wall of the diaphragm into short panel lengths 32 and, in addition, increase the moment-of-inertia of the cylinder wall cross-section. As a result, the cylinder wall may be made substantially thinner than that which could be tolerated without buckling in a smooth cylinder wall design without ribs or indentations. This is an important feature of the invention because the thinner walls unroll at lower pressures, consume less volume, and reduce weight.

Preferably, the walls of the diaphragm cylinder for a 7.75 inch diameter are formed of an 1100 aluminum (annealed to the −0 condition) with .032 inch walls containing a 2-lead indentation of which the helical indentation or rib pitch should be approximately .3 inch.

In operation, as is illustrated sequentially in FIGS. 1, 3 and 4, pressure fluid from a suitable source is admitted to the tank 12 by way of the inlet port 24 to act against the liquid expelling piston 14 and move it to the right to expel the liquid in the tank through the discharge port 26 when the built-up pressure bursts the disc 28.

As the piston 14 moves to the right toward the tank end 20 expelling the liquid in the tank, the thin, flexible diaphragm which acts as a seal between the piston and the tank and which is rolled backwardly 180° to be hermetically sealed to the periphery of the piston 14, is further rolled toward the right as the piston moves until it assumes the position shown in FIG. 4 at the completion of liquid expulsion.

It will now be readily apparent that the thin, flexible helically indented or ribbed diaphragm with its increased resistance to buckling enables the use of an increased cylinder length with a resultant increase in the volume of liquid which may be stored and expelled.

We claim:

1. In combination, a tank for storing a maximum of liquid to be expelled therefrom and having a pair of ends with parallel surfaces; a rigid piston arranged parallel to and mounted in said tank against one of said ends and movable by pressure fluid to abut the other of said ends to completely expel liquid from the tank; said one end including an inlet port to direct a pressurizing fluid against said abutting piston to effect movement thereof and the other of said ends having a liquid discharge port; and a flexible, cylindrical diaphragm having a diameter slightly less than that of said tank and having one end peripherally and hermetically sealed to the inner surface of said tank at a point intermediate its ends, the other end of said diaphragm being rollable backwardly within itself by said piston upon liquid expelling movement thereof and peripherally and hermetically sealed to said rigid piston; said cylindrical diaphragm including helically disposed indentations to strengthen it against the lateral forces of the pressurizing fluid acting on the piston.

2. The combination recited in claim 1 wherein said cylindrical diaphragm comprises a plurality of helically disposed panels integrally connected by said indentations.

3. In combination, a tank for storing a maximum of liquid to be expelled therefrom and having a pair of ends with parallel surfaces; a rigid piston arranged parallel to and mounted in said tank against one of said ends and movable by pressure fluid to abut the other of said ends to completely expel liquid from the tank; said one end including an inlet port to direct a pressurizing fluid against said abutting piston to effect movement thereof and the other of said ends having a liquid discharge port; and a flexible, cylindrical diaphragm having a diameter slightly less than that of said tank and having one end peripherally and hermetically sealed to the inner surface of said tank at a point intermediate its ends, the other end of said diaphragm being rollable backwardly within itself by said piston upon liquid expelling movement thereof and peripherally and hermetically sealed to said rigid piston; said cylindrical diaphragm including helically disposed ribs to strengthen it against the lateral forces of the pressurizing fluid acting on the piston.

4. The combination recited in claim 3 wherein said cylindrical diaphragm comprises a plurality of helically disposed panels integrally connected by said ribs.

References Cited

UNITED STATES PATENTS

| | | | |
|---|---|---|---|
| 810,403 | 1/1906 | Fulton et al. | 222—95 |
| 2,009,761 | 7/1935 | Calderara | 222—95 |
| 2,918,936 | 12/1959 | Dawson | 222—386.5 X |
| 2,970,452 | 2/1961 | Beckman et al. | 222—386.5 X |
| 3,104,526 | 9/1963 | Hirschfeld et al. | 222—386.5 X |
| 3,112,845 | 12/1963 | Bryant | 222—386.5 X |
| 3,145,884 | 8/1964 | Everett | 222—386.5 |
| 3,197,087 | 7/1965 | Black | 222—386.5 |

VERLIN R. PENDEGRASS, Primary Examiner